US007980977B2

(12) United States Patent
Nosaka et al.

(10) Patent No.: US 7,980,977 B2
(45) Date of Patent: Jul. 19, 2011

(54) POWER TRANSMISSION APPARATUS

(75) Inventors: Michiyasu Nosaka, Anjo (JP); Hiroshi Nagae, Toyohashi (JP); Masahiro Yamashita, Hamamatsu (JP); Yasuo Tabuchi, Toyoake (JP); Yoshiki Tada, Okazaki (JP); Mitsuhiro Tanabe, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 108 days.

(21) Appl. No.: 12/382,580

(22) Filed: Mar. 19, 2009

(65) Prior Publication Data
US 2009/0186728 A1 Jul. 23, 2009

Related U.S. Application Data

(62) Division of application No. 11/345,632, filed on Feb. 2, 2006, now abandoned.

(30) Foreign Application Priority Data

Feb. 4, 2005 (JP) ................................. 2005-028965
Feb. 15, 2005 (JP) ................................. 2005-037740

(51) Int. Cl.
*F16H 55/16* (2006.01)
(52) U.S. Cl. ..................................................... 474/166
(58) Field of Classification Search .................... 474/166
See application file for complete search history.

(56) References Cited

U.S. PATENT DOCUMENTS

| 5,011,390 | A | 4/1991 | Sakamaki et al. |
| 6,494,799 | B1 | 12/2002 | Ochiai |
| 7,025,680 | B2 | 4/2006 | Tabuchi et al. |
| 7,041,020 | B2 * | 5/2006 | Singer ........................ 474/166 |
| 2004/0166944 | A1 | 8/2004 | Nosaka et al. |
| 2004/0176200 | A1 * | 9/2004 | Nosaka et al. ................ 474/166 |
| 2005/0143208 | A1 * | 6/2005 | Ozawa et al. ................ 474/166 |
| 2006/0178241 | A1 * | 8/2006 | Nosaka et al. ................ 474/166 |
| 2006/0240926 | A1 * | 10/2006 | Wiesneth et al. ............. 474/166 |

FOREIGN PATENT DOCUMENTS

| JP | 51-061680 | 5/1976 |
| JP | 57-167925 | 10/1982 |
| JP | A-2001-227620 | 8/2001 |
| JP | A-2003-120791 | 4/2003 |

OTHER PUBLICATIONS

Office Action dated Dec. 3, 2008 in corresponding Japanese patent application No. 2005-028965 (and English translation).

* cited by examiner

*Primary Examiner* — Michael R Mansen
*Assistant Examiner* — Robert T Reese
(74) *Attorney, Agent, or Firm* — Posz Law Group, PLC

(57) ABSTRACT

A power transmission apparatus includes a pulley 1 having a belt attached thereto to transmit the rotating drive force, a hub 2 which connects the pulley to a rotating shaft of a driven device, a bearing 7 which rotatably supports the pulley, and a sleeve ring 5 which is fitted and secured to the pulley and attaches the bearing to the pulley to prevent it relatively moving. The sleeve ring is provided, on its first end opposite to the driven device, with a bent portion 5*b* against which the bearing abuts to restrict further movement of the bearing. An annular retainer 6 is provided on the portion of the bearing adjacent to the drive device. The bearing is secured to the sleeve ring through the annular retainer by calking a second end 5*a* of the sleeve ring opposite to the first end. The sleeve ring is provided with a projection 5*f* which projects in the axial direction from the rear surface of the pulley and a casing 9 is provided with an annular groove 9*c* which at least partly receives therein the projection.

5 Claims, 9 Drawing Sheets

FRONT SIDE ← → REAR SIDE

FRONT SIDE ← → REAR SIDE

FRONT SIDE ⟵⟶ REAR SIDE

FRONT SIDE ←——————→ REAR SIDE

FRONT SIDE ←——————→ REAR SIDE

FRONT SIDE ←→ REAR SIDE

POWER TRANSMISSION APPARATUS

BACKGROUND OF THE INVENTION

1. Field of the Invention

The present invention relates to a power transmission apparatus, having a torque limiting function, which is particularly useful for a compressor, for an air conditioner in a vehicle, which is always driven by an external power source, such as an engine, through a belt or the like.

2. Description of the Related Art

A refrigerant compressor for an air conditioner in a vehicle and, in particular, a car air conditioner, is driven by an external drive source, such as an engine, through a belt and a pulley, etc. An electromagnetic clutch may be provided between the compressor and the engine to selectively establish a connection therebetween. However, an electromagnetic clutch is often not provided to reduce the manufacturing cost. In the absence of an electromagnetic clutch, the power transmission mechanism is provided with a torque limiter to prevent the engine from being influenced by trouble on the compressor side.

FIG. 11 shows a known power transmission apparatus with a torque limiter for use with a car air conditioner. FIG. 12 shows an enlarged view of a sleeve ring of a power transmission apparatus. In FIG. 11, the metal sleeve ring 5 which is formed integrally with a resin pulley 1 by insert-molding is provided on its rear end (right end in FIGS. 11 and 12) with an inwardly bent portion 5b. A bearing 7 is inserted in the sleeve ring 5 from the front side (left side in FIG. 11) of the sleeve ring 5 until the bearing abuts against the bent portion 5b. After that, the front end of the sleeve ring 5 in FIG. 11 is calked to form a calked portion 5a to thereby secure the bearing 7 to the sleeve ring 5. Thus, the bearing 7 is attached to the pulley 1. However, in this arrangement, if an external load is applied in the forward direction of the pulley, the calked portion 5a receives the load, so that sufficient calking strength cannot be obtained. As a result, the calked portion is loosened, and consequently, the position of the bearing 7 relative to the sleeve ring 5 and accordingly to the pulley 1 deviates, resulting in breakage of the bearing, etc.

Furthermore, in the case of a pulley made of a metal, heat generated in the bearing 5 is passed to the air through the metal pulley. However, in the case of a conventional resin pulley, heat generated in the bearing 5 tends not to be radiated through the pulley made of resin, thus resulting in reduction of the durability of the bearing.

To this end, in the prior art, the sleeve ring integrally formed with the resin pulley by insert-molding can have an extension extending from the portion that is in contact with the bearing to define a heat radiating portion which is exposed to the air, as disclosed in Japanese Unexamined Patent Publication No. 2001-227620.

However, in the resin pulley as disclosed in JPP '620, the extension of the sleeve ring in the axial direction to provide a large heat radiating surface area of the sleeve ring increases the thickness of the entire pulley, thus leading to an increase in the size of the power transmission apparatus. In order to decrease the thickness of the pulley, if the rear portion of the sleeve ring is made larger in the radial and outward direction, as shown in FIG. 13, a pulley thickness t large enough to ensure the strength of the resin pulley cannot be obtained.

SUMMARY OF THE INVENTION

The present invention has been completed to eliminate the drawbacks, of the prior art, mentioned above. It is an object of the present invention to provide a power transmission apparatus in which, unlike the prior art in which the sleeve ring is bent at the rear end and is calked at the front end to secure the bearing after the latter is inserted in the sleeve ring, the shape of the sleeve ring is modified so that the front end of the ring is bent and an annular retainer is fitted to the ring from the rear end thereof and is calked after the bearing is inserted from the rear side of the ring. With this arrangement, no positional deviation of the bearing occurs if an external load is applied to the pulley.

Another object of the present invention is to provide a power transmission apparatus in which the heat radiating efficiency of the sleeve ring is enhanced so as to sufficiently radiate the heat of the bearing, so that the service life of the bearing can be prolonged.

According to an aspect of the present invention, there is provided a power transmission apparatus to transmit a rotating drive force from a driving device, such as an engine to a driven deice, such as a compressor, comprising a pulley having a belt attached thereto to transmit the rotating drive force, a hub which connects the pulley to a rotating shaft of the driven device, a bearing which rotatably supports the pulley, and a sleeve ring which is fitted and secured to the pulley and attaches the bearing to the pulley so as not to relatively move, wherein said sleeve ring is provided, on its first end opposite to the driven device, with a bent portion against which the bearing abuts to restrict a further movement of the bearing, and the bearing is secured to the sleeve ring by subjecting a second end of the sleeve ring opposite to the first end to a deformation, connection or crimping, etc.

With this structure, the first end (front end) of the sleeve ring opposite to the driven device side is bent and the bearing is fitted to the sleeve ring from the second end (rear end) on the driven device side, and the second end of the sleeve ring is calked. Consequently, if an external load is applied to the pulley, positional deviation of the bearing does not occur.

In an embodiment, the power transmission apparatus further comprises an annular member and the sleeve ring receives therein the bearing. The annular member is located in the sleeve ring to abut against the bearing on the driven device side.

With this arrangement, the annular member makes it possible to secure the bearing to the sleeve ring more easily and in various methods.

In an embodiment of the invention, concrete shapes of the annular member are exemplified as follows. Namely, the annular member can be in the form of a circular ring having a square, rectangular, circular, elliptical or U-shaped sectional shape.

In an embodiment of the invention to specify the connection of the bearing to the sleeve ring, the bearing can be secured to the sleeve ring by calking the second end of the sleeve ring.

The bent portion may be made of a piece separate from the sleeve ring. With this structure, as the sleeve ring and the bent portion can be made of separate pieces and can be simplified in shape, the machining of the sleeve ring can be facilitated.

In an embodiment of the invention, a torque limiter is provided.

In an embodiment to specify the application of the power transmission apparatus, it can be used with an air conditioner for a vehicle.

According to another aspect of the invention, there is provided a power transmission apparatus comprising a pulley which is made of resin and is rotatably attached to a casing through a bearing, a hub which is provided at a front end of a rotating shaft extending outward from the casing so as to rotate together with the rotating shaft, a torque limiter which interrupts transmission of excess torque between the pulley and the rotating shaft, and a metal sleeve ring between the bearing and the pulley, wherein said sleeve ring is provided with a projection which extends in the axial direction more outwardly than the rear surface of the pulley, and said casing is provided with a groove which surrounds at least a part of the projection.

With this structure, it is possible to provide a heat radiating surface area of the sleeve ring large enough to effectively radiate the heat of the bearing. As a result, the service life of the bearing can be prolonged.

In an embodiment of the invention, the sleeve ring is provided on its rear side with a bent portion which partly extends in the axial direction to define the projection. Alternatively, the bent portion may partly extend in the radial direction to define the projection. In these arrangements, the heat radiating surface of the sleeve ring can be increased.

In an embodiment of the invention, the sleeve ring is provided with an annular member made of a separate piece which abuts against the sleeve ring and which extrudes more rearwardly than the sleeve ring whereby a part of the annular member defines the projection. In this arrangement, the heat radiating surface area of the sleeve ring can be increased to thereby improve the heat radiation of the bearing in order to prolong the service life of the bearing.

The present invention may be more fully understood from the description of preferred embodiments of the invention, as set forth below, together with the accompanying drawings.

DESCRIPTION OF THE PREFERRED EMBODIMENTS

Preferred embodiments of a power transmission apparatus according to the present invention will be discussed below with reference to the accompanying drawings. In the embodiments, the power transmission apparatus is advantageously used for a car air conditioner and is driven by an external power source such as an engine through a belt , etc., wherein the power is transmitted to a refrigerant compressor, which is always driven by an engine, not having an electromagnetic clutch mechanism. In a car air conditioner not having an electromagnetic clutch, a torque limiter is usually provided in a power transmission system.

Figure 1:
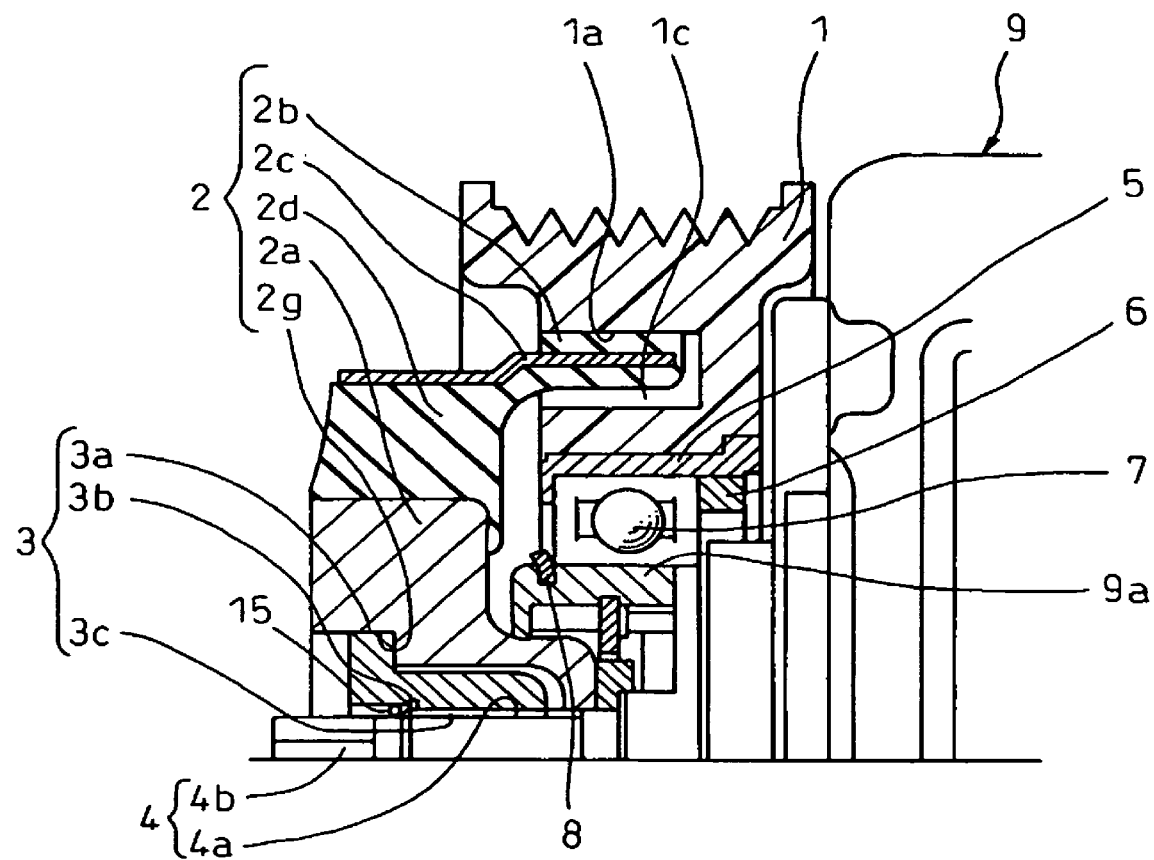
FIG. 1 is a longitudinal sectional view of an upper half of a power transmission apparatus according a first embodiment of the present invention.
Figure 2:
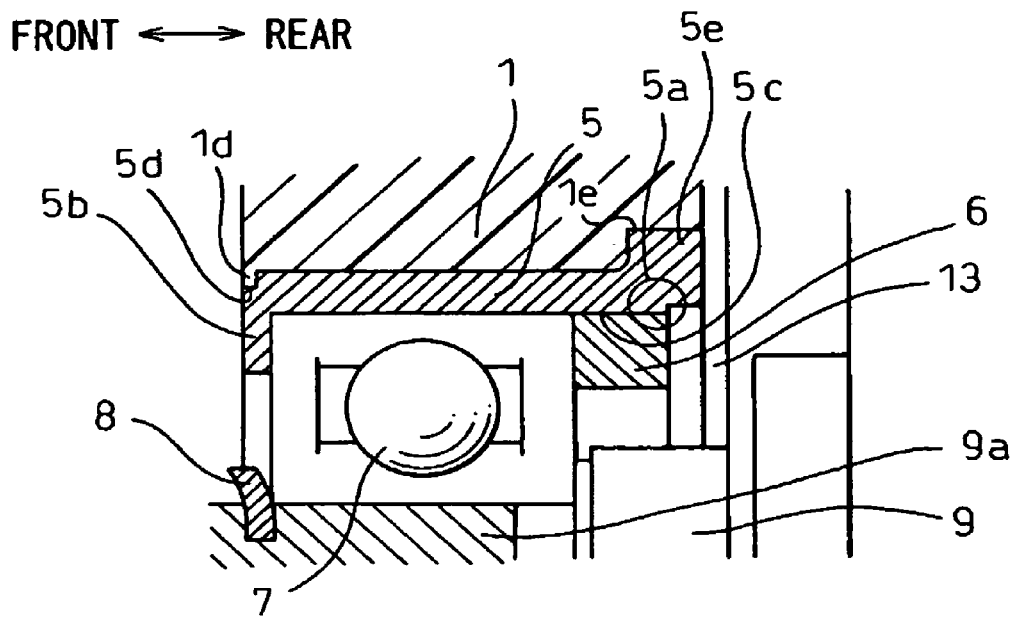
FIG. 2 is an enlarged partial sectional view of a sleeve ring and its surroundings in a power transmission apparatus shown in FIG. 1.
Figure 11:
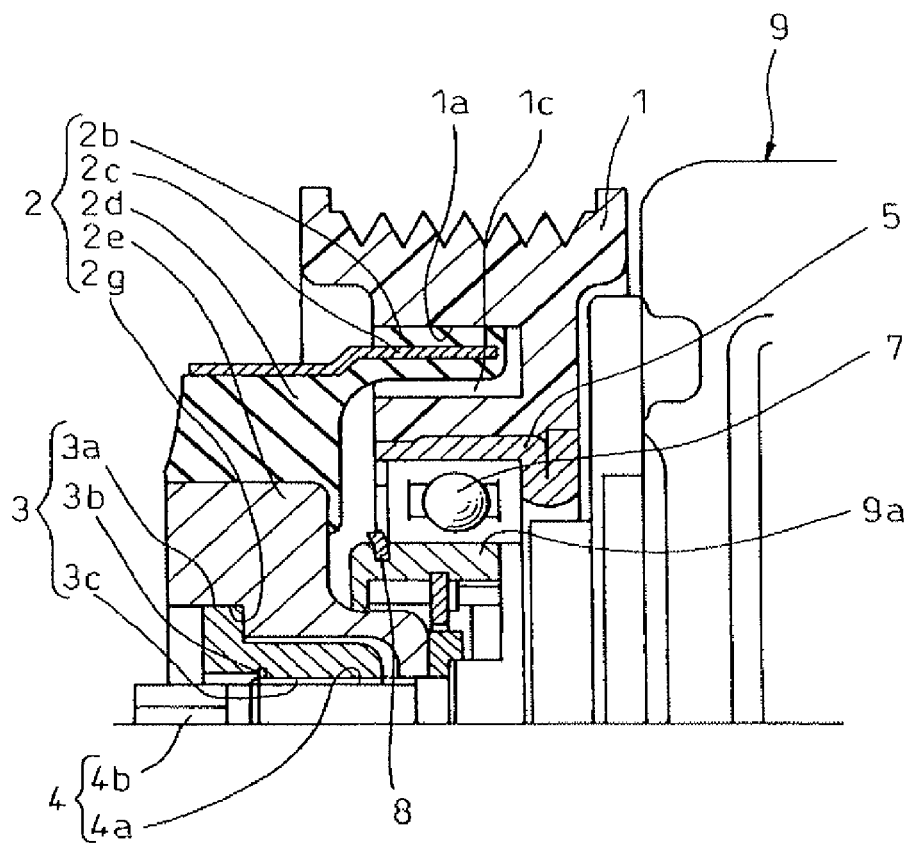
FIG. 11 is a longitudinal sectional view of an upper half of a power transmission apparatus disclosed in a prior patent application filed by the assignee of the present application.
Figure 12:
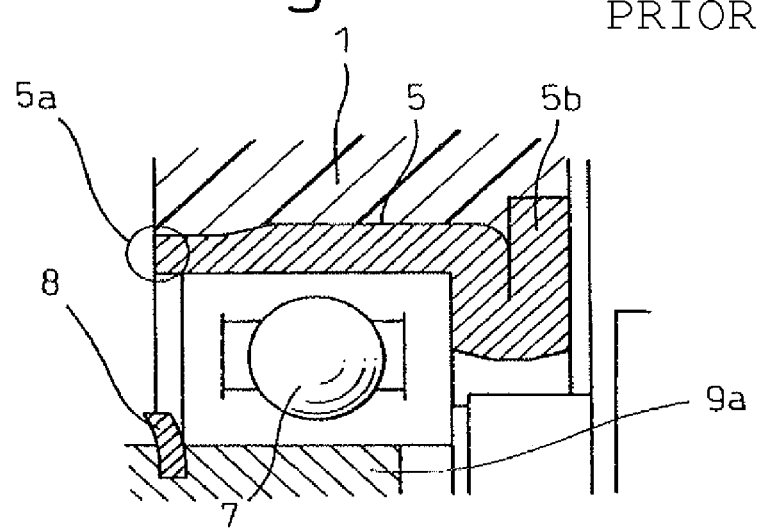
FIG. 12 is an enlarged view of main components in a power transmission apparatus shown in FIG. 11.

FIGS. 1 and 2 schematically show a first embodiment of a power transmission apparatus according to the present invention. FIG. 1 shows a longitudinal sectional view of an upper half of a power transmission apparatus and FIG. 2 shows an enlarged partial sectional view of a sleeve ring and its surroundings in a power transmission apparatus shown in FIG. 1. In FIGS. 1 and 2, the elements corresponding to those in the prior art shown in FIGS. 11 and 12 are designated with the same reference numerals.

The structure of the power transmission apparatus shown in FIG. 1 will be discussed below. The power transmission apparatus transmits the external power supplied from an engine, etc., through a belt (not shown) to a compressor (not shown). The power transmission apparatus is comprised of a pulley 1 to which the belt is wound, a hub 2 which connects the pulley 1 to a rotating shaft 4 of the compressor, a torque limiter 3 which connects the pulley 1 to the rotating shaft 4 and breaks the connection when an excess torque is transmitted thereto to thereby protect the drive device, etc., and a bearing 7 which rotatably supports the pulley 1. In this embodiment, it is preferable that the pulley 1 is made of resin.

The hub 2 is comprised of a cylindrical thick inner hub 2a, a cylindrical thin outer hub 2c, and an elastic portion 2d which connects the inner hub 2a and the outer hub 2c. The elastic portion 2d is made of an elastic material such as resin or rubber. The hub 2 is integrally formed by connecting the inner hub 2a to the elastic portion 2d and connecting the elastic portion 2d to the outer hub 2c. As can be seen in FIG. 1, the outer hub 2c and the elastic portion 2d surrounding the same have cylindrical extensions that are inserted in a space defined by a pulley side engagement portion 1a of the pulley 1 having projections and depressions and a pocket 1c. The outer peripheral surface of the hub 2, that is, the outer peripheral surface of the elastic portion 2d is provided with a hub side engagement portion 2b having projections and depressions corresponding to those of the pulley side engagement portion 1a, so that the projections and depressions of the pulley side engagement portion can be engaged with the depressions and projections of the hub side engagement portion. Furthermore, the hub side engagement portion 2b and the pulley side engagement portion 1a are welded to firmly secure the pulley 1 and the hub 2.

The connection method of the pulley 1 and the hub 2 is not limited to the foregoing. For example, a smooth flat inner surface of the pulley 1 and a smooth flat outer surface of the hub 2 may be welded.

The torque limiter 3 is in the form of a cylinder having a large diameter portion and a small diameter portion, corresponding to the inner hub 2a of the hub 2. The torque limiter (3) is provided with a stepped fitting portion 3a which is fitted to the fitting portion 2g of the hub 2. The small diameter portion is provided on its inner surface with an internal thread 3c which substantially extends over the overall length thereof. The torque limiter 3 is provided, at the end of the threaded portion 3c on the inner surface thereof, with an annular cut-away 3b which can be easily broken when an excess axial force is applied.

The rotating shaft 4 of the compressor is provided with an external thread 4a at the front end at which is provided with a tool mounting portion 4b having a sectional shape corresponding to an assembling tool. A sealing O-ring 15 is provided between the torque limiter 3 and the rotating shaft 4 in the vicinity of and in front of the external thread 4a of the rotating shaft 4, as shown in FIG. 1

The hub 2, the torque limiter 3 and the rotating shaft 4, constructed as above are assembled as follows. Namely, the internal thread 3c of the small diameter portion of the torque limiter 3 and the external thread 4a of the rotating shaft 4 are screw-engaged and the torque limiter 3 is inserted in the hub 2, with the fitting portion 3a of the torque limiter 3 abutting against the fitting portion 2g of the hub 2. Further screwing-in of the torque limiter 3 on the rotating shaft 4 causes the torque limiter 3 to press the hub 2 against the compressor casing 9, so that the rotating shaft 4 and the hub 2 or the pulley 1 are connected together.

The pulley 1 (i.e., the power transmission apparatus) is connected to the rotating shaft 4 of the compressor and is rotatably supported by the stepped boss portion 9a, which is a part of the casing 9 of the compressor, through the bearing 7. The bearing 7 is fitted on the stepped boss portion 9a, so that the inner race of the bearing 7 is immovably retained by a snap ring 8, as shown in FIG. 1.

The structure of the components of the power transmission apparatus including the pulley 1, the hub 2, and the torque limiter 3, etc., and the assembling method are not limited to those discussed above by way of example and can be variously modified by a person skilled in the art.

The connection between the outer race of the bearing 7 and the pulley 1 will be discussed below, which is one of the most significant features of the present invention. FIG. 1 shows a representative arrangement thereof. The metal sleeve ring 5 integrally formed with resin pulley 1 by insert molding is bent inwardly at the front end (left end in FIG. 1) located in front of the pulley 1. The bearing 7 is inserted in the sleeve ring 5 from the rear end of the sleeve ring 5. The annular member 6 having a square or rectangular section is inserted in the sleeve ring 5 to which the bearing 7 has been attached from the rear side. After that, the rear end (calking portion 5a) of the sleeve ring 5 is calked to assemble the sleeve ring 5 and the bearing 7 together. The annular member 6 prevents the bearing 7 from being damaged when the sleeve ring 5 is calked.

FIG. 2 shows an enlarged view of the sleeve ring shown in FIG. 1. The sleeve ring 5 integrally formed with the resin pulley 1 by insert molding is provided with an inwardly bent portion 5b, an annular member inserting portion 5c in which the annular member 6 is inserted, and a calking portion 5a which is calked after the annular member 6 is attached. The bearing 7 is inserted from the rear side of the sleeve ring 5 to the bent portion 5b, and, thereafter, the sleeve ring 6 is inserted and the calking portion 5a is calked to complete the assembly. In this structure, if a load is applied directly to the pulley from the front side of the pulley (left side in FIG. 2), the bent portion 5b supports the load and, accordingly, positional deviation of the bearing 7 relative to the sleeve ring 5, i.e., the pulley 1, does not occur.

The sleeve ring 5 is provided, on its end corner on the side (front side) opposite to the compressor and adjacent to the pulley 1 (outer diameter side), with a cut-away portion (stepped portion) 5d in which a projection 1d provided on the pulley 1 is fitted, as shown in FIG. 2. As the projection 1d supports a load from the rear side (compressor side), the axial force in the forward direction, which is produced for example when the calking portion 5a is calked together with the annular member 6 is supported by the projection 1d. Consequently, an external force produced upon calking does not act on the bearing 7 due to the projection 1d. As the bent portion 5b is long enough to be flexible or deflectable when it receives the forward axial force, the load is substantially supported by the projection 1d.

Figure 5:
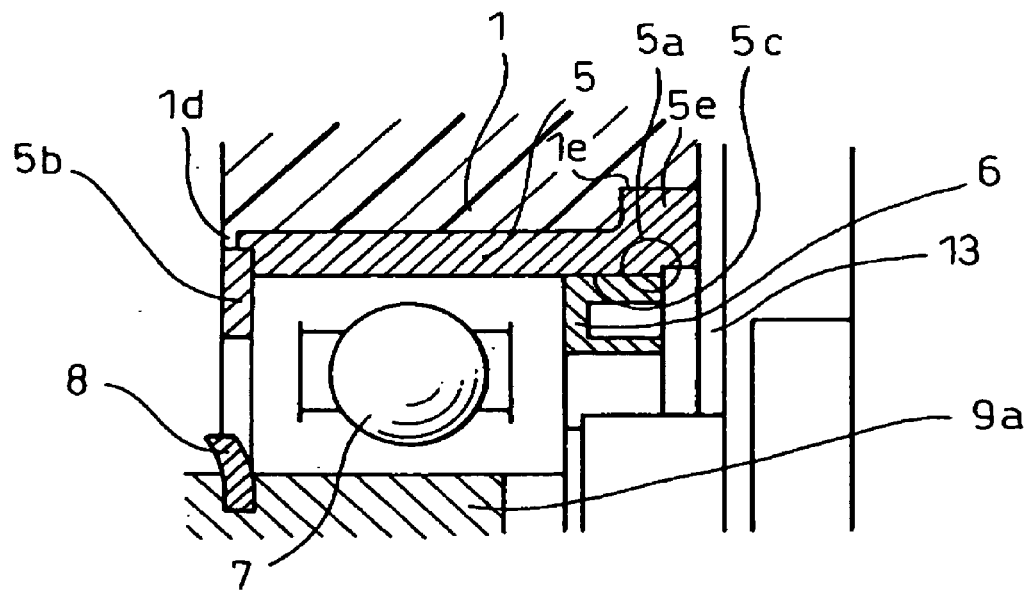
FIG. 5 is a partial sectional view of a sleeve ring and its surroundings, similar to FIG. 2, according to a third embodiment of the present invention.

Furthermore, the sleeve ring 5 is provided, on its end corner on the compressor side (rear side) and adjacent to the pulley 1 (outer diameter side), with an extension 5e which is bent radially and outwardly. The pulley 1 is provided with a stepped portion 1e corresponding to the extension 5e. The extension 5e is fitted in the stepped portion 1e to assist the mounting of the sleeve ring 5 to the pulley 1. Moreover, as the extension 5e has a large surface area to define a heat radiation surface, as shown in FIG. 5, heat generated in the bearing 7 during the rotation of the pulley 1 can be passed into the space 13 on the compressor side, through the extension 5e. Thus, the heat radiating efficiency can be enhanced by the extension 5e.

Figure 3:
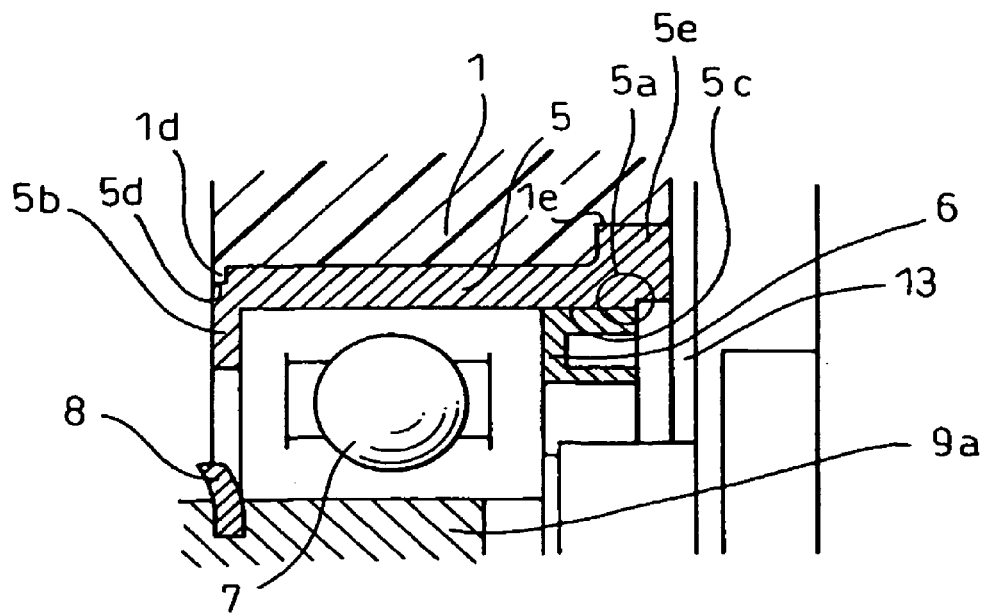
FIG. 3 is a partial sectional view of a sleeve ring and its surroundings, similar to FIG. 2, according to a second embodiment of the present invention.
Figure 4:
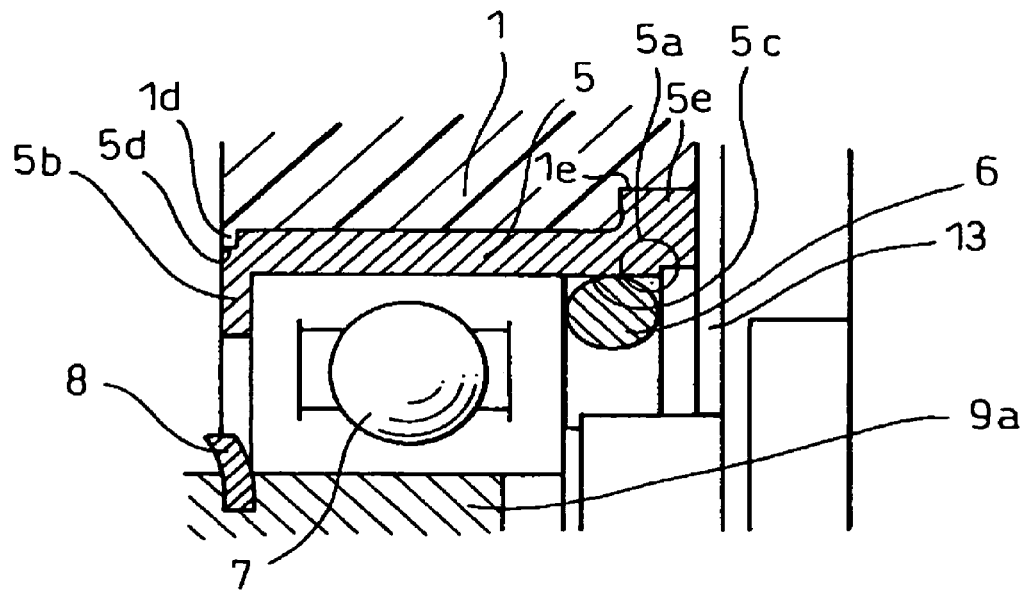
FIG. 4 is a partial sectional view of a sleeve ring and its surroundings, similar to FIG. 2, according to a modification of a second embodiment of the present invention.

FIGS. 3 and 4 show a second embodiment of the invention and a modification thereof, respectively. In FIGS. 3 and 4, the components corresponding to those in the first embodiment shown in FIGS. 1 and 2 are designated with like reference numerals. In the first embodiment, the annular member 6 may be made of a U-shaped ring, as shown in FIG. 3, or a wire having a circular or elliptical section, as shown in FIG. 4.

It is also possible to secure the bearing 7 to the sleeve ring 5 by press-fitting the annular member 6, in place of calking. Alternatively, the connection using an adhesive may be adopted to secure the bearing 7 to the sleeve ring. Moreover, the bent portion 5b is not limited to a specific shape and can be, for example, circular (or annular), or can be partly bent, provided that it is turned inwardly.

Other structures in the second and modified embodiments are the same as that in the first embodiment and accordingly an explanation will not be given hereinafter.

FIG. 5 shows a third embodiment of the present invention. In FIG. 5, the components corresponding to those in the first embodiment shown in FIGS. 1 and 2 are designated with like reference numerals. The third embodiment shown in FIG. 5 is addressed to the bent portion of the sleeve ring. In this embodiment, the bent portion is made of a separate piece from the sleeve ring and is in the form of an annular receiving plate 5b which is secured to the sleeve ring 5 by press fitting, welding etc. Other structures in the third embodiment are the same as those in the first embodiment.

The effects and the mode of operation of the embodiments mentioned above will be explained below.

In a power transmission apparatus according to the first embodiment of the present invention, the following effects can be expected.

In the prior art, the front end of the sleeve ring is calked after the bearing is inserted in the sleeve ring to retain the bearing, and hence, the position of the bearing can be moved if an external load is applied to the pulley. In the present invention, the front end of the sleeve ring is bent, the bearing is inserted from the rear side of the sleeve ring, the annular retainer is attached to the bearing from the rear end of the sleeve ring, and the rear end of the sleeve ring is calked. With this structure, the if an external load is applied to the pulley, positional deviation of the bearing does not occur.

In a power transmission apparatus according to the second embodiment of the present invention, the bearing can be secured to the sleeve ring by means of connecting methods other than calking, such as crimping, adhering or welding, etc.

In a power transmission apparatus according to the third embodiment of the present invention, the following effects can be further expected.

As the bent portion is made of a separate piece from the sleeve ring body, the sleeve ring and the bent portion can be simplified in shape, and thus the sleeve ring can be more easily machined.

Figure 6:
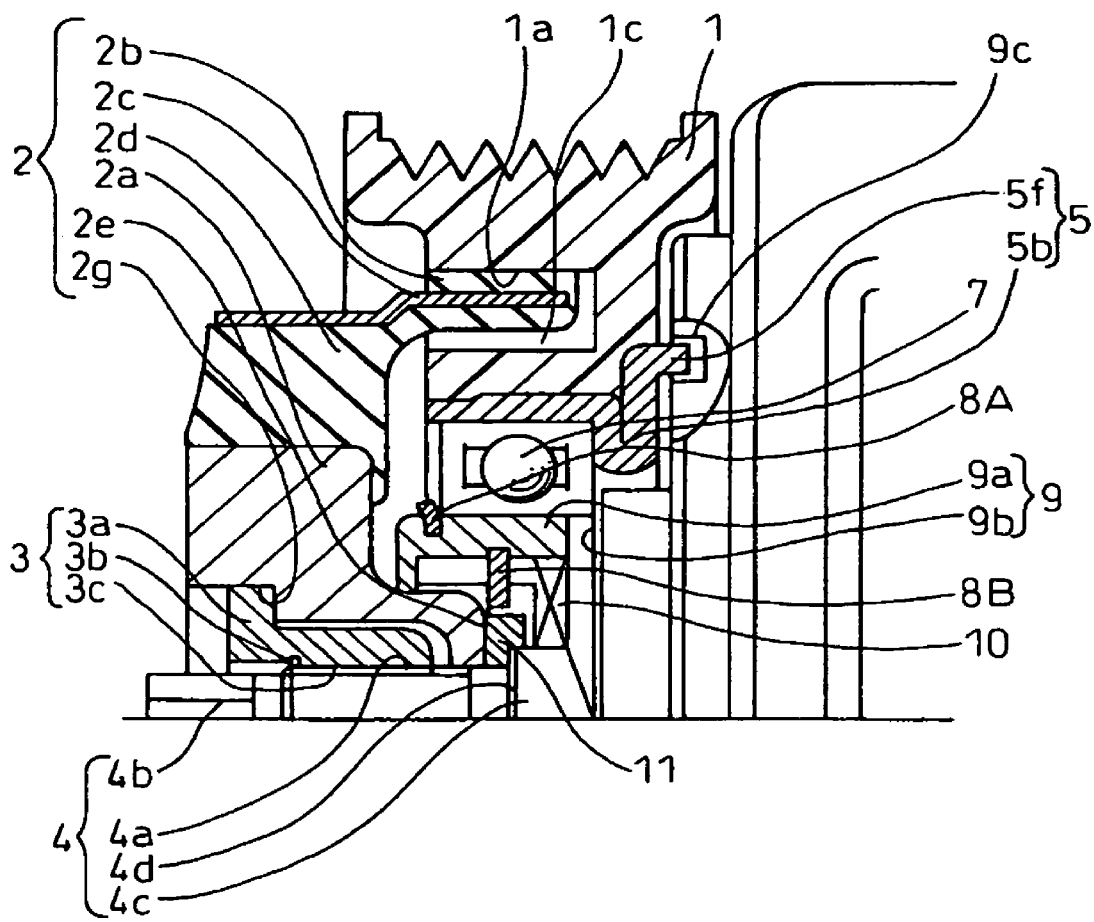
FIG. 6 is a longitudinal sectional view of an upper half of a power transmission apparatus according a fourth embodiment of the present invention.
Figure 7:
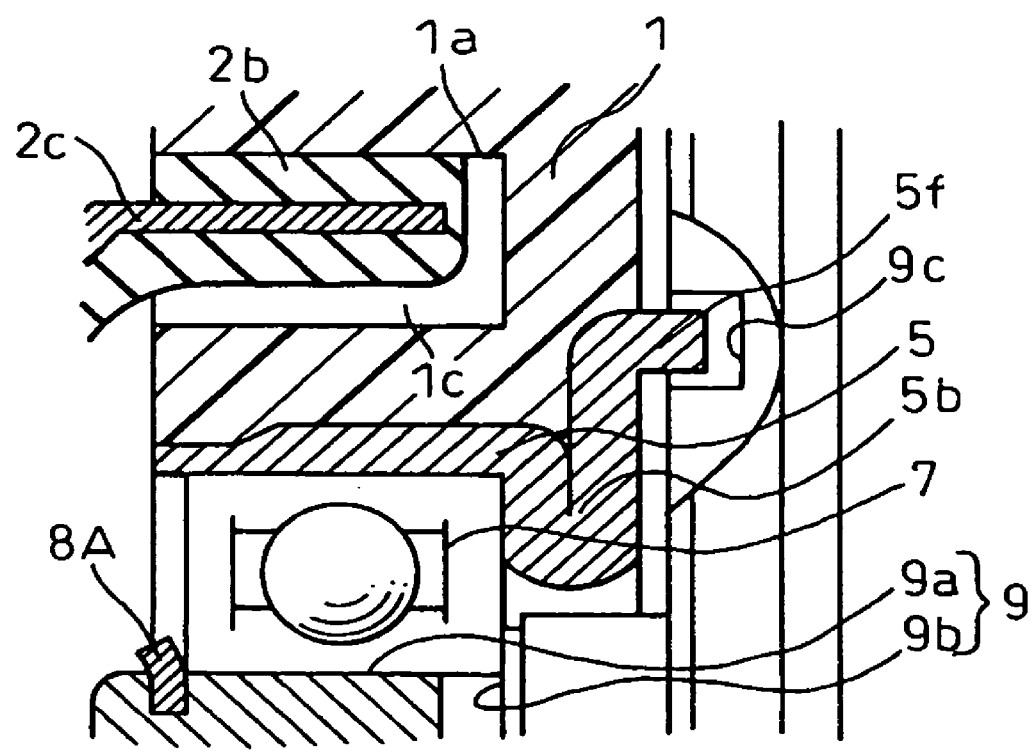
FIG. 7 is an enlarged view of main components in a fourth embodiment of the present invention.
Figure 8:
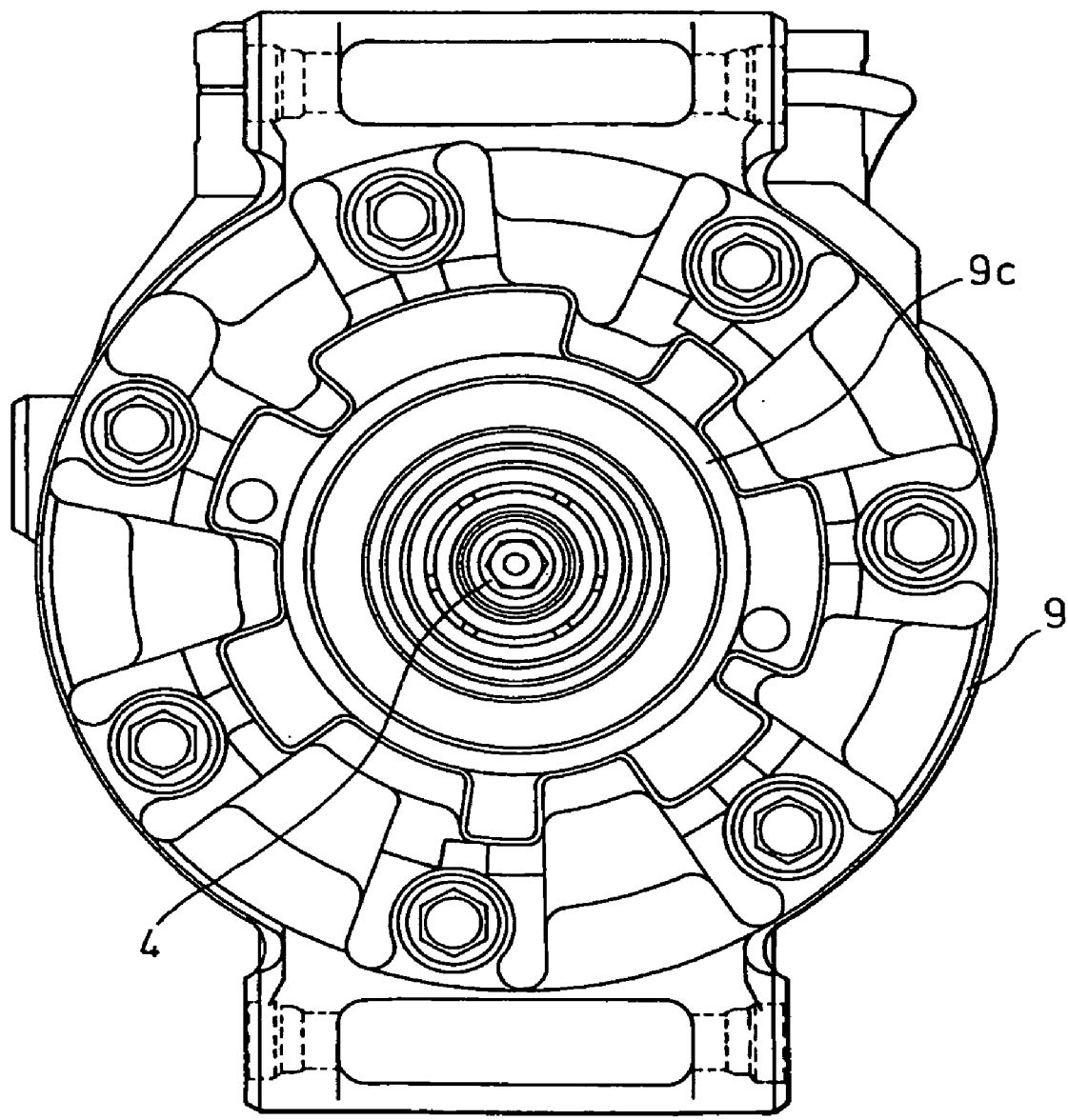
FIG. 8 is a front elevational view of a casing of a compressor.

FIG. 6 shows a longitudinal section of an upper half of a power transmission apparatus according to a fourth embodiment of the present invention, FIG. 7 is an enlarged view of main parts thereof, and FIG. 8 is a front elevation of a casing of a compressor.

The pulley 1 is rotatably mounted to the cylindrical boss portion 9a provided at one end of the compressor casing 9 through the bearing 7 and the sleeve ring 5. The pulley 1 is preferably made of thermoplastic synthetic resin. In case of a resin pulley, the pulley 1 and the sleeve ring 5 are usually integrally formed by insert-molding. A belt (not shown) is wound around the outer periphery of the pulley 1, so that the pulley 1 is rotated by an external drive source, such as an engine or a motor. The bearing 7 is fitted to the boss portion 9a and is held between a first snap ring 8A fitted in a peripheral groove formed in the periphery of the boss portion 9a and the terminal end 9b of the boss portion 9a so as not to move in the axial direction. The casing 9 and the rotating shaft 4 are sealed by a sealing device 10 to prevent leakage of an oil or coolant, etc. The axial movement of the sealing device 10 is restricted by a second snap ring 8B fitted in an inner peripheral groove of the boss portion 9a.

The front end of the rotating shaft 4 of the compressor extends outward from the casing 9 and is comprised of a tool mounting portion 4b having a sectional shape corresponding to a tool, a threaded portion 4a having an external thread, and a large diameter shaft portion 4c having a diameter larger than the threaded portion 4a. The portions 4b, 4a and 4c are located in this order from the front side. An end portion 4d is defined between the threaded portion 4a and the large diameter shaft portion 4c. The threaded portion 4a of the rotating shaft 4 is screw-engaged by a torque limiter 3 to which the hub 2, which will be discussed hereinafter, is secured. The torque limiter 3 may be secured to the rotating shaft 4 by means other than the screw-engagement, such as a spline or a bolt. A washer 11 is fitted to the rotating shaft 4 at a position determined by the end portion 4d.

The torque limiter 3 is in the form of a circular or polygonal cylinder having a large diameter portion and a small diameter portion. The large diameter portion defines a fitting portion 3a which is fitted in the inner hub 2a. The small diameter portion is provided on its inner peripheral surface with an internal thread 3c which can be screw-engaged by the external thread 4a of the rotating shaft 4. The inner diameter of the large diameter portion is slightly larger than the inner diameter of the small diameter portion and a cut-away portion 3b is formed at a transition between the inner peripheral surfaces of the small diameter portion and the large diameter portion. The cut-away portion 3b can be easily broken when an excess axial force is applied to the torque limiter 3.

The hub 2 is comprised of an inner hub 2a, a torque transmitting elastic portion 2d and an outer hub 2c. The inner hub 2a is substantially cylindrical and has an inner peripheral surface shape corresponding to the outer peripheral surface shape of the limiter 3. The torque limiter 3 is provided with a fitting portion 2g which is fitted onto the outer periphery (fitting portion) of the large diameter portion of the torque limiter 3. For example, the fitting portion 2g of the inner hub 2a and the fitting portion 3a of the torque limiter 3 are hexagonal. Alternatively, the fitting portions 2g and 3a may be respectively provided with internal and external threads for screw-engagement. In this alternative, both the fitting portions 3a and 2g are cylindrical. Thus, the inner hub 2a and the torque limiter 3 are secured by fitting. The inner hub 2a is held between the torque limiter 3 and the washer 11 when the rear end 2e of the inner hub 2a abuts against the washer 11. The outer peripheral surface of the inner hub 2a is connected to the torque transmitting elastic portion 2d by an adhesive or the like.

The outer hub 2c is cylindrical and is made of a metal such as an iron, similarly to the inner hub 2a. The torque transmitting elastic portion 2d which is made of an elastic material such as a rubber or resin is held between the inner hub 2a and the outer hub 2c and is secured to the outer periphery of the inner hub 2a and the inner periphery of the outer hub 2c by an adhesive or the like. Alternatively, it is also possible to form the three portions integrally by insert-molding. The elastic portion 2d serves not only as a torque transmitter but also as a torque damper.

Substantially half of the outer hub 2c on the rear side extends, so that the extension is surrounded by the torque transmitting elastic portion 2d, as shown in FIGS. 6 and 7. The upper side and lower surfaces (outer peripheral surfaces) of the elastic portion 2d are provided with depressions and projections to define a hub side engagement portion 2b. It is not always necessary to provide the depressions and projections on all the three surfaces and it is possible to provide the depressions and projections only one or two of the three surfaces. The depressions and projections are in the form of involute splines or trochoids, etc.

The hub side engagement portion 2b is substantially annular as a whole, but does not define a complete annulus. Namely, the hub side engagement portion 2b is provided with a plurality of slits (not shown) spaced at a predetermined space in the circumferential direction. The slits are provided to correspond to reinforcing members (reinforcing ribs, not shown) provided on the pulley.

Note that although the hub 2 is comprised of the inner hub 2a, the torque transmitting elastic portion 2d, and the outer hub 2c, in this embodiment, the outer hub 2c can be dispensed with, so that the hub 2 is comprised of only the inner hub 2a and the torque transmitting elastic portion 2d.

The pulley 1 is provided, on its front end, with a pocket 1c which is defined by an annular recess to receive therein the hub side engagement portion 2b. The three peripheral surfaces of the pocket 1c are provided with depressions and projections to define a pulley side engagement portion 1a corresponding to the hub side engagement portion 2b with depressions and projections. It is not always necessary to provide the depressions and projections on all the three surfaces and it is possible to provide the depressions and projections only one or two of the three surfaces, corresponding to the surfaces of the hub side engagement portion 2b. The depressions and projections are in the form of involute splines or trochoid, etc.

Thus, the hub 2 and the pulley 1 are connected when the hub side engagement portion 2b is inserted in the pocket 1c of the pulley 1 so that the hub side engagement portion 2b and the pulley side engagement portion 1a are in mesh with each other through the depressions and projections.

Figure 13:
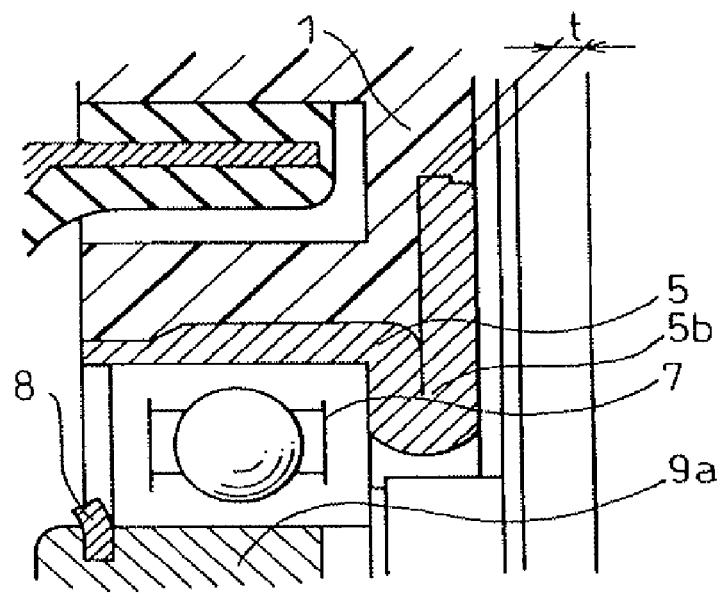
FIG. 13 is an enlarged view of main components in a modified example of a power transmission apparatus shown in FIG. 11.

In general, the metal sleeve ring 5, integrally formed with the resin pulley 1 by insert molding, is provided with a bent or turned portion 5b at the rear end and has an overall width substantially identical to the thickness of the pulley 1 so that the rear surface of the sleeve ring 5 is flush with the rear surface of the pulley 1, as shown in FIGS. 11, 12 and 13. Consequently, as shown in FIGS. 11 and 12, it is impossible to obtain a sufficient heat radiating surface area of the sleeve ring 5. In order to obtain a sufficient heat radiating surface area, the thickness t of the pulley 1 cannot be large enough to obtain a sufficient strength of the pulley 1.

To this end, in the fourth embodiment of the present invention shown in FIG. 7, the rear end of the sleeve ring 5 (tip of the bent portion 5b) extends in the axial direction to define a projection 5f. The casing 8 is provided with an annular groove 9c corresponding to the projection 5f, as shown in FIG. 8, so that the projection 5f can be loosely inserted in the annular groove 9c.

Consequently, it is possible to form the projection 5f of the sleeve ring 5 which extends outward from the rear surface of the pulley 1 without increasing the space between the pulley 1 and the casing 9. Thus, the heat radiating surface can be increased while reserving the sufficient thickness t of the pulley 1. Therefore, heat generated in the bearing during the operation of the compressor can be effectively radiated to thereby prolong the service life of the bearing 7.

As the projection 5f of the sleeve ring 5 overlaps the casing 9, water cannot enter the bearing 7 if the apparatus is submerged in water.

Figure 9:
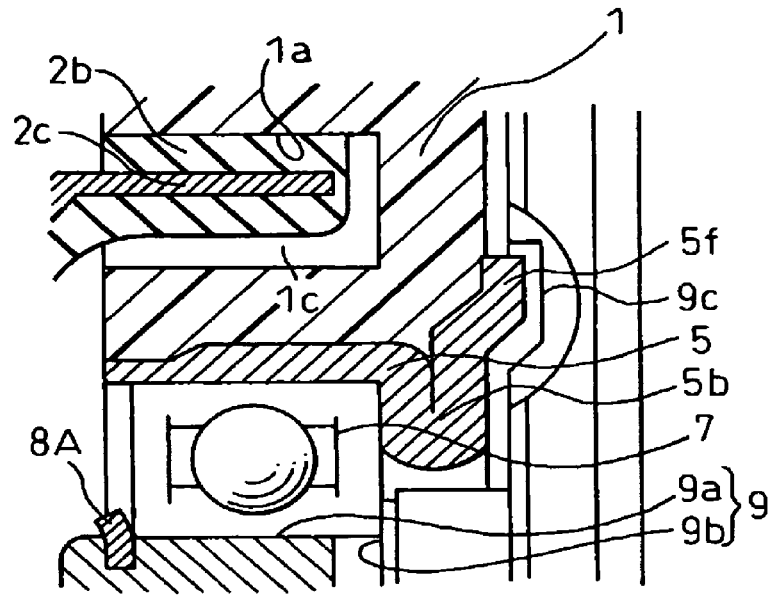
FIG. 9 is an enlarged view of main components in a fifth embodiment of the present invention.

FIG. 9 shows an enlarged view of main parts in a fifth embodiment of the present invention. In the fifth embodiment, the rear end of the sleeve ring 5 (tip of the bent portion 5b) extends to define a projection 5f in the radial direction without reducing the thickness t of the pulley 1. In the fifth embodiment, the projection 5f protrudes more rearwardly than the rear surface of the pulley 1, i.e., in the axial direction. The casing 9 is provided with an annular groove 9c corresponding to the projection 5f so that the projection 5f can be partly received in the annular groove 9c, as in the fourth embodiment. Other structure in the fifth embodiment is the same as that of the fourth embodiment and on duplicate explanation will not be given hereinafter.

Figure 10:
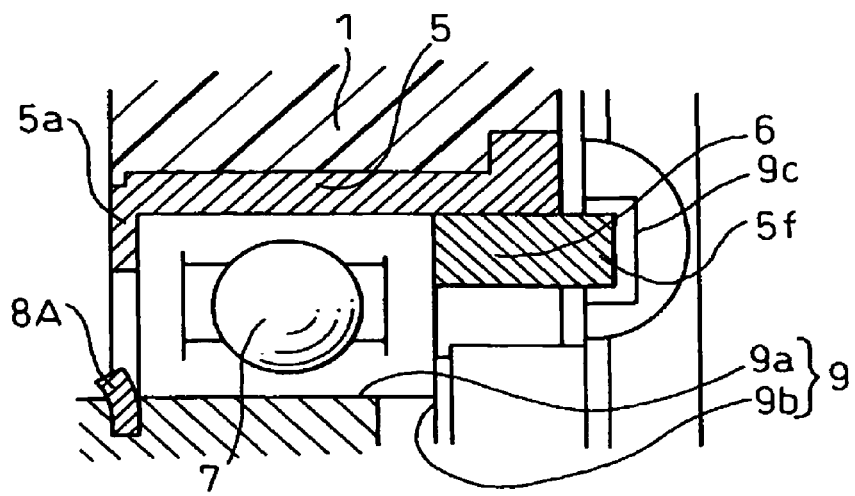
FIG. 10 is an enlarged view of main components in a sixth embodiment of the present invention.

FIG. 10 shows an enlarged view of main parts in a sixth embodiment of the present invention. In the sixth embodiment, the sleeve ring 5 has no bent portion 5b and is substantially cylindrical. The sleeve ring 5 is bent inwardly at the front end to define the calking portion 5a. The sleeve ring 5 is provided with an annular member 6 made of a piece separate therefrom, which abuts against the inner peripheral surface of the sleeve ring 5. The bearing 7 is held between the calking portion 5a of the sleeve ring 5 and the annular member 6 and is restricted in the axial movement, in cooperation with the first snap ring 8A. The rear end of the annular member 6 protrudes rearwardly from the rear surfaces of the sleeve ring 5 and the pulley 1 to define the projection 5f. The casing 9 is provided with an annular groove 9c corresponding to the projection 5f, so that the projection 5f of the annular member 6 can be partly received in the annular groove 9c. Other structures of the sixth embodiment are the same as those in the fourth embodiment and an explanation therefor will not be given.

In the fifth and sixth embodiments of the invention, the heat radiating surface area of the sleeve ring 5 can be increased without decreasing the thickness t of the pulley 1, so that heat generated in the bearing 7 can be effectively radiated, thus leading to prolongation of the service life of the bearing 7.

In the foregoing, the discussion has been applied to a power transmission apparatus for an air conditioner for a car. However, the present invention is not limited thereto and it can be used for apparatuses other than a car air conditioner.

The torque limiter discussed above or shown in the drawings is of a type which is broken at the cut-away portion. However, the present invention is not limited thereto. For example, a torque limiter of which a connector pin is cut by shearing can be used. The torque limiter may be provided on the rotating shaft side or the elastic portion of the hub.

The significant features of the power transmission apparatus of the present invention reside in the pulley, the bearing which supports the pulley and the sleeve ring for mounting the bearing to the pulley. Therefore, other structures, for example, the hub, the torque limiter, the connecting mechanism of the pulley and the hub, the connecting mechanism of the hub and the rotating shaft, etc., are not limited to those in the embodiments mentioned above.

While the invention has been described by reference to specific embodiments chosen for purposes of illustration, it should be apparent that numerous modifications could be made thereto, by those skilled in the art, without departing from the basic concept and scope of the invention.

The invention claimed is:

1. A power transmission apparatus comprising a pulley which is made of resin and is rotatably attached to a casing through a bearing, a hub which is provided at a front end of a rotating shaft extending outward from the casing so as to rotate together with the rotating shaft, a torque limiter which interrupts transmission of excess torque between the pulley and the rotating shaft, and a metal sleeve ring between the bearing and the pulley, wherein said sleeve ring is provided with a projection which extends in the axial direction of the rotating shaft more outwardly than the rear surface of the pulley opposite to a front surface of said casing, and said casing is provided with a groove which surrounds at least a part of the projection.

2. A power transmission apparatus according to claim 1, wherein said sleeve ring is provided on its rear side with a bent portion which partly extends in the axial direction to define said projection.

3. A power transmission apparatus according to claim 1, wherein said sleeve ring is provided on its rear side with a bent portion which partly extends in the radial direction to define said projection.

4. A power transmission apparatus according to claim 1, wherein said sleeve ring is provided with an annular member made of a separate piece which abuts against the sleeve ring, and which extends more rearwardly than the sleeve ring, whereby a part of the annular member defines the projection.

5. A power transmission apparatus according to claim 1, wherein the pulley comprises a rotation portion having a plurality of grooves attachable with a belt and a pulley hub located on an internal circumference side of the rotation portion and fitted with the bearing, and wherein the sleeve ring is arranged on the internal circumference side of the pulley hub.

* * * * *